US012708847B2

(12) United States Patent
Hu et al.

(10) Patent No.: US 12,708,847 B2
(45) Date of Patent: Aug. 18, 2026

(54) METHOD AND APPARATUS FOR DISPLAYING VIRTUAL ENVIRONMENT PICTURE, DEVICE, AND STORAGE MEDIUM

(71) Applicant: TENCENT TECHNOLOGY (SHENZHEN) COMPANY LIMITED, Shenzhen (CN)

(72) Inventors: Xun Hu, Shenzhen (CN); Jianmiao Weng, Shenzhen (CN); Yulin Wan, Shenzhen (CN); Shandong Su, Shenzhen (CN); Yong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 152 days.

(21) Appl. No.: 18/613,289

(22) Filed: Mar. 22, 2024

(65) Prior Publication Data

US 2024/0226736 A1 Jul. 11, 2024

Related U.S. Application Data

(63) Continuation of application No. 17/504,278, filed on Oct. 18, 2021, now Pat. No. 11,992,759, which is a (Continued)

(30) Foreign Application Priority Data

Apr. 20, 2020 (CN) ......................... 202010313797.6

(51) Int. Cl.
*A63F 13/52* (2014.01)

(52) U.S. Cl.
CPC .................................... *A63F 13/52* (2014.09)

(58) Field of Classification Search
CPC ........... A63F 13/55; A63F 13/52; A63F 13/58
See application file for complete search history.

(56) References Cited

U.S. PATENT DOCUMENTS 9,919,213 B2 3/2018 Dunn
10,444,871 B2 10/2019 Wang
(Continued)

FOREIGN PATENT DOCUMENTS

CN 105148517 A 12/2015
CN 105194873 A 12/2015
(Continued)

OTHER PUBLICATIONS

The State Intellectual Property Office of the People's Republic of China (SIPO) Office Action 1 for for 202010313797.6 Mar. 19, 2021 10 Pages (including translation).
(Continued)

*Primary Examiner* — Steve Rowland
(74) *Attorney, Agent, or Firm* — Anova Law Group, PLLC

(57) ABSTRACT

A method and apparatus for displaying a virtual environment picture includes: displaying a user interface (UI), the UI including a virtual environment picture and a wheel skill control, the virtual environment picture being obtained by observing a virtual environment from an observing perspective of a first virtual character, and the wheel skill control being a control configured to cast a directional skill; receiving a skill cast operation on the wheel skill control; and skipping displaying a skill indicator in the virtual environment picture in response to that the skill cast operation is a fast cast operation and a selected second virtual character exists, the skill indicator being configured to indicate at least one of an aiming direction of the directional skill and a cast region.

20 Claims, 12 Drawing Sheets

Related U.S. Application Data continuation of application No. PCT/CN2021/079590, filed on Mar. 8, 2021.

(56) References Cited

U.S. PATENT DOCUMENTS 10,702,774 B2 7/2020 Wang et al.
10,786,733 B2 9/2020 Tang et al.
2004/0157662 A1* 8/2004 Tsuchiya ............. A63F 13/5378 463/32
2006/0258453 A1* 11/2006 Kando .................... A63F 13/52 463/36
2006/0287027 A1* 12/2006 Hardisty ................. A63F 13/45 463/8
2007/0270215 A1* 11/2007 Miyamoto .............. A63F 13/45 463/32
2008/0214304 A1* 9/2008 Castle ..................... A63F 13/10 463/36
2009/0143141 A1* 6/2009 Wells .................. G07F 17/3239 463/37
2009/0181736 A1* 7/2009 Haigh-Hutchinson ...................... A63F 13/55 463/2
2009/0325660 A1* 12/2009 Langridge ............... A63F 13/45 463/2
2011/0092284 A1* 4/2011 Kando .................... A63F 13/10 463/31
2012/0322523 A1* 12/2012 Woodard ................ A63F 13/69 463/2
2013/0196767 A1* 8/2013 Garvin .................. A63F 13/422 463/36
2013/0241829 A1 9/2013 Kim
2014/0118563 A1 5/2014 Mehta et al.
2015/0157932 A1* 6/2015 Kwon .................... G06Q 50/00 463/31
2015/0258439 A1* 9/2015 Prosin ..................... A63F 13/00 463/31
2016/0129345 A1* 5/2016 Seok ..................... A63F 13/213 463/31
2017/0319961 A1 11/2017 Dunn
2018/0024660 A1* 1/2018 Wang .................. G06F 3/04817 273/110
2018/0147488 A1* 5/2018 Tang ..................... A63F 13/422
2019/0091570 A1 3/2019 Wang et al.
2021/0138351 A1 5/2021 Yu
2021/0286446 A1 9/2021 Wang

FOREIGN PATENT DOCUMENTS

CN 107398071 A 11/2017
CN 107754308 A 3/2018
CN 107992251 A 5/2018
CN 109117050 A * 1/2019 ......... G06F 3/04886
CN 109117075 A 1/2019
CN 109316745 A 2/2019
CN 109800047 A 5/2019
CN 110115838 A 8/2019
CN 110448891 A 11/2019
CN 110559658 A 12/2019
CN 110955370 A 4/2020
CN 111530075 A 8/2020
EP 2383027 A2 11/2011
JP 2017201513 A 11/2017
JP 2018516715 A 6/2018

OTHER PUBLICATIONS

The World Intellectual Property Organization (WIPO) International Search Report for PCT/CN2021/079590 Jun. 3, 2021 8 Pages (including translation).
Zhe Feng, "won't set the king glory action key? after reading this, you'll understand it all," Zhihu.com, Jun. 6, 2017, Retrieved from the Internet: URL: https://zhuanlan.zhihu.com/p/27263090. 53 pages.
Intellectual Property Office of Singapre (IPOS) The Office Action For Application No. 11202110996V Mar. 8, 2023 12 Pages.
Japan Patent Office (JPO) The Office Action For JP Application No. 2021-566186 Dec. 6, 2022 6 Pages (Translation Included).
The European Patent Office (EPO) The Extended European Search Report for 21773275.9 May 11, 2022 11 Pages.

* cited by examiner

Component 1100

| Field | Value |
|---|---|
| Activity type | Skill indicator |
| Rule | 11004 |
| Component path | Indicator_new_Range03(IndicatorCtrl) |
| Show Cover Effect | |
| Show Selecedt Target Effect | |
| Minimap indicator | |
| Shadow type | Encircle |
| Stop following After ButtonUp | |
| Position-following type | Enable |
| Forward-following type | Follow |
| Outer circle radius | 2 |
| Inner circle radius | 0.5 |
| Position offset | X Y |
| Offset following type | Indicator |
| Following offset angle | 0 |
| Dynamic type | Indicator_new_Range03(IndicatorCtrl) |
| Is Orange Color | |

METHOD AND APPARATUS FOR DISPLAYING VIRTUAL ENVIRONMENT PICTURE, DEVICE, AND STORAGE MEDIUM

CROSS-REFERENCES TO RELATED APPLICATIONS

This application is a continuation application of U.S. application Ser. No. 17/504,278 filed on Sep. 14, 2024; U.S. application Ser. No. 17/504,278 is a continuation application of PCT Patent Application No. PCT/CN2021/079590, filed on Mar. 8, 2021, which claims priority to Chinese Patent Application No. 202010313797.6, filed on Apr. 20, 2020 and entitled "METHOD AND APPARATUS FOR DISPLAYING VIRTUAL ENVIRONMENT PICTURE, DEVICE, AND STORAGE MEDIUM", the entire contents of all of which are incorporated herein by reference.

FIELD OF THE TECHNOLOGY

Embodiments of the present disclosure relate to the field of computer and Internet technologies, and in particular, to a method and apparatus for displaying a virtual environment picture, a device, and a storage medium.

BACKGROUND OF THE DISCLOSURE

A battle game is a game in which a plurality of user accounts compete in the same scene. Optionally, the battle game may be a multiplayer online battle arena (MOBA) game.

In a typical MOBA game, a picture of a virtual environment (also called a virtual environment picture) displayed on a client is a picture obtained by using a first virtual character as an observation entity to observe the virtual environment, e.g., a picture from first-person perspective. A user may control the first virtual character to cast a skill in a designated direction to attack an opponent virtual character in the designated direction. When the user controls the first virtual character to aim in the designated direction or a designated region, a skill indicator is displayed on the virtual environment picture. The skill indicator is configured to show the user an action direction and an action position of the skill after the skill is cast. If the opponent virtual character is located in the action range indicated by the skill indicator, in this case, the user controls the first virtual character to cast the skill, and the first virtual character can attack the opponent virtual character.

In some cases, the skill indicator interferes with the observation of the virtual environment picture performed by the user.

SUMMARY

Embodiments of the present disclosure provide a method and apparatus for displaying a virtual environment picture, a device, and a storage medium, to reduce the display of a skill indicator in some unnecessary cases, thereby reducing interference to a virtual environment picture. The technical solutions are as follows.

According to one aspect of the present disclosure, a method for displaying a virtual environment picture is provided, including: displaying a user interface (UI), the UI including a virtual environment picture and a wheel skill control, the virtual environment picture being obtained by observing a virtual environment from an observing perspective of a first virtual character, and the wheel skill control being a control configured to cast a directional skill; receiving a skill cast operation on the wheel skill control; and skipping displaying a skill indicator in the virtual environment picture in response to that the skill cast operation is a fast cast operation and a selected second virtual character exists, the skill indicator being configured to indicate at least one of an aiming direction of the directional skill and a cast region.

According to another aspect of the present disclosure, an apparatus for displaying a virtual environment picture is provided, including: a display module, configured to display a UI, the UI including a virtual environment picture and a wheel skill control, the virtual environment picture being obtained by observing a virtual environment from an observing perspective of a first virtual character, and the wheel skill control being a control configured to cast a directional skill; and an interaction module, configured to receive a skill cast operation on the wheel skill control, the display module being configured to skip displaying a skill indicator in the virtual environment picture in response to that the skill cast operation is a fast cast operation and a selected second virtual character exists, the skill indicator being configured to indicate at least one of an aiming direction of the directional skill and a cast region.

According to another aspect of the present disclosure, a computer device is provided, including a processor and a memory, the memory storing at least one instruction, at least one program, a code set or an instruction set, the at least one instruction, the at least one program, the code set or the instruction set being loaded and executed by the processor to implement: displaying a user interface (UI), the UI including a virtual environment picture and a wheel skill control, the virtual environment picture being obtained by observing a virtual environment from an observing perspective of a first virtual character, and the wheel skill control being a control configured to cast a directional skill; receiving a skill cast operation on the wheel skill control; and skipping displaying a skill indicator in the virtual environment picture in response to that the skill cast operation is a fast cast operation and a selected second virtual character exists, the skill indicator being configured to indicate at least one of an aiming direction of the directional skill and a cast region.

According to another aspect of the present disclosure, a non-transitory computer-readable storage medium is provided, the computer-readable storage medium storing at least one instruction, at least one program, a code set or an instruction set, the at least one instruction, the at least one program, the code set or the instruction set being loaded and executed by a processor to implement the method for displaying a virtual environment picture described in the foregoing aspects.

The technical solutions provided in the embodiments of the present disclosure include at least the following beneficial effects:

When a skill cast operation on a wheel skill control is a fast cast operation, a first virtual character is used as a reference position in a virtual environment picture to display a range indicator, and a skill indicator is not displayed. Because a second virtual character is not selected by a user but selected by a client according to a default attack-object selection rule, the no display of the skill indicator does not affect a normal skill cast and can further reduce impact and interference of the skill indicator on a visual field of the user, thereby increasing a percentage of effective information in the visual field of the user.

BRIEF DESCRIPTION OF THE DRAWINGS

To describe the technical solutions in the embodiments of the present disclosure more clearly, the accompanying drawings required for describing the embodiments are briefly described hereinafter. Apparently, the accompanying drawings in the following descriptions show merely some embodiments of the present disclosure, and a person of ordinary skill in the art may obtain other accompanying drawings according to these accompanying drawings without creative efforts.

FIG. 11 is a schematic diagram of a configuration interface of a skill indicator according to another exemplary embodiment of the present disclosure.

FIG. 12 is a schematic diagram of a configuration interface of a display rule according to another exemplary embodiment of the present disclosure.

DESCRIPTION OF EMBODIMENTS

Figure 1:
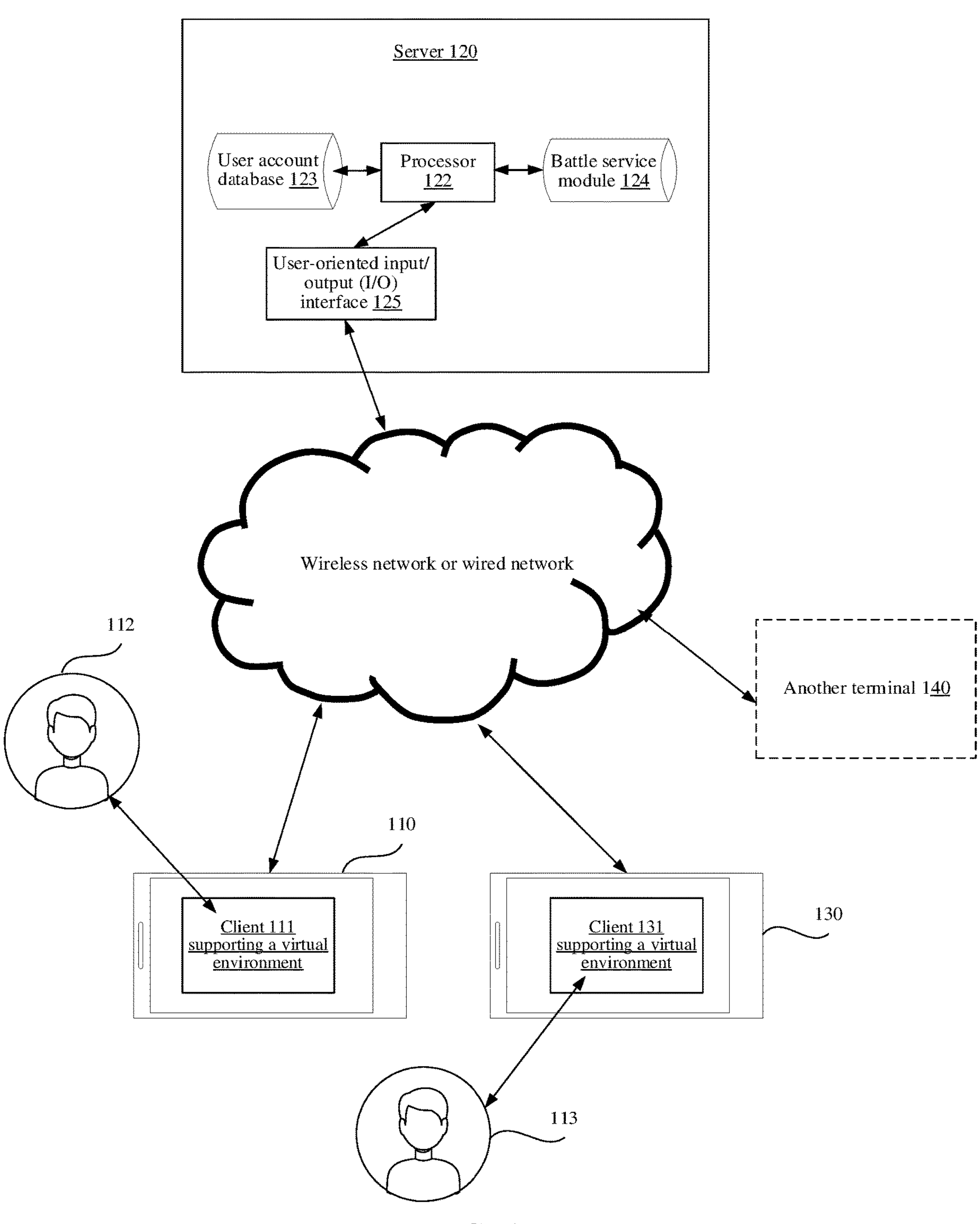
FIG. 1 is a structural block diagram of a computer system according to an exemplary embodiment of the present disclosure.

To make objectives, technical solutions, and advantages of the present disclosure clearer, the following further describes implementations of the present disclosure in detail with reference to the accompanying drawings.

First, terms described in the embodiments of the present disclosure are briefly introduced.

A virtual environment is a virtual environment displayed (or provided) by an application when run on a terminal. The virtual environment may be a simulated world of a real world, or may be a semi-simulated semi-fictional three-dimensional world, or may be an entirely fictional three-dimensional world. The virtual environment may be any one of a two-dimensional virtual environment, a 2.5-dimensional virtual environment, and a three-dimensional virtual environment. Optionally, the virtual environment is further used for a virtual environment battle between at least two virtual characters, and there are virtual resources available to the at least two virtual characters in the virtual environment. Optionally, the virtual environment includes a lower left corner region and an upper right corner region that are symmetrical. Virtual characters on two opposing sides occupy the regions respectively, and the objective of each side is to destroy a target building, a fort, a base, or a crystal deep in the opponent's region to win victory.

A virtual character is a movable object in a virtual environment. The movable object may be at least one of a virtual person, a virtual animal, and a cartoon person. Optionally, when the virtual environment is a three-dimensional virtual environment, virtual characters may be three-dimensional models. Each virtual character has a shape and a volume in the three-dimensional virtual environment, and occupies some space in the three-dimensional virtual environment. Optionally, the virtual character is a three-dimensional character constructed based on a three-dimensional human skeleton technology. The virtual character wears different skins to implement different appearances. In some implementations, the virtual character may be alternatively implemented by using a 2.5-dimensional model or a two-dimensional model. This is not limited in the embodiments of the present disclosure.

An MOBA is an arena in which different virtual teams on at least two opposing camps occupy respective map regions in a virtual environment, and compete against each other using a specific victory condition as a goal. The victory condition includes, but is not limited to at least one of occupying a fort or destroying a fort of the opposing camp, killing virtual characters in the opposing camp, ensuring own survival in a specified scene and time, seizing a specific resource, or outscoring the opponent within a specified time. The battle arena game may take place in rounds. The same map or different maps may be used in different rounds of the battle arena game. Each virtual team includes one or more virtual characters, for example, 1 virtual character, 2 virtual characters, 3 virtual characters, or 5 virtual characters.

A MOBA game is a game in which several forts are provided in a virtual environment, and users on different camps control virtual characters to battle in the virtual environment to occupy forts or destroy forts of the opposing camp. For example, in the MOBA game, the users may be divided into two opposing camps. The virtual characters controlled by the users are scattered in the virtual environment to compete against each other, and the victory condition is to destroy or occupy all opponent forts. The MOBA game takes place in rounds. A duration of one round of the MOBA game is from a moment at which the game starts to a movement at which the victory condition is met.

A UI control is any visual control or element that can be seen (no display is included) in a UI of an application, for example, a control such as a picture, an input box, a text box, a button, or a label. Some UI controls respond to an operation of a user, for example, a skill control, which controls a first virtual character to cast a skill. The user triggers the skill control to control the first virtual character to cast the skill.

FIG. 1 is a structural block diagram of a computer system according to an exemplary embodiment of the present disclosure. The computer system 100 includes a first terminal 110, a server 120, and a second terminal 130.

A client 111 supporting a virtual environment is installed and run on the first terminal 110, and the client 111 may be a multiplayer online battle program. When the first terminal runs the client 111, a UI of the client 111 is displayed on a screen of the first terminal 110. The client may be any one of a military simulation program, an escape shooting game, a virtual reality (VR) application, an augmented reality (AR) program, a three-dimensional map program, a VR game, an AR game, a first-person shooting (FPS) game, a third-person shooting (TPS) game, a MOBA game, and a simulation game (SLG). In this embodiment, an example in which the client is a MOBA game is used for description. The first terminal 110 is a terminal used by a first user 112. The first user 112 uses the first terminal 110 to control a first virtual character located in the virtual environment to perform activities, and the first virtual character may be referred to as a first virtual character of the first user 112. The activities of the first virtual character include, but are not limited to: at least one of adjusting body postures, crawling, walking, running, riding, jumping, driving, picking, shooting, attacking, and throwing. For example, the first virtual character is a first virtual person, for example, a simulated person character or a cartoon person character.

A client 131 supporting the virtual environment is installed and run on the second terminal 130, and the client 131 may be a multiplayer online battle program. When the second terminal 130 runs the client 131, a UI of the client 131 is displayed on a screen of the second terminal 130. The client may be any one of a military simulation program, an escape shooting game, a VR application, an AR program, a three-dimensional map program, a VR game, an AR game, an FPS game, a TPS game, a MOBA game, and an SLG. In this embodiment, an example in which the client is a MOBA game is used for description. The second terminal 130 is a terminal used by a second user 113. The second user 113 uses the second terminal 130 to control a second virtual character located in the virtual environment to perform activities, and the second virtual character may be referred to as a first virtual character of the second user 113. For example, the second virtual character is a second virtual person, for example, a simulated person character or a cartoon person character.

Optionally, the first virtual character and the second virtual character are located in the same virtual environment. Optionally, the first virtual person and the second virtual person may belong to the same side, the same team or the same organization, may be friends of each other, or may have a temporary communication permission. Optionally, the first virtual person and the second virtual person may belong to different sides, different teams or different organizations or may be enemies of each other.

Optionally, the client installed on the first terminal 110 is the same as the client installed on the second terminal 130, or the clients installed on the two terminals are the same type of clients of different operating system platforms (Android system or iOS system). The first terminal 110 may generally refer to one of a plurality of terminals, and the second terminal 130 may generally refer to another one of a plurality of terminals. In this embodiment, only the first terminal 110 and the second terminal 130 are used as an example for description. Device types of the first terminal 110 and the second terminal 130 are the same or different. The device type includes at least one of a smartphone, a tablet computer, an ebook reader, a moving picture experts group audio layer III (MP3) player, a moving picture experts group audio layer IV (MP4) player, a laptop computer, and a desktop computer.

FIG. 1 shows only two terminals. However, a plurality of other terminals 140 may access the server 120 in different embodiments. Optionally, one or more terminals 140 are terminals corresponding to a developer. A developing and editing platform for the client supporting a virtual environment is installed on the terminal 140. The developer may edit and update the client on the terminal 140 and transmit an updated client installation package to the server 120 by using a wired or wireless network. The first terminal 110 and the second terminal 130 may download the client installation package from the server 120 to update the client.

The first terminal 110, the second terminal 130, and the another terminal 140 are connected to the server 120 through a wireless network or a wired network.

The server 120 includes at least one of one server, a plurality of servers, a cloud computing platform, and a virtualization center. The server 120 is configured to provide a background service for a client supporting a virtual environment. Optionally, the server 120 is responsible for primary computing work, and the terminals are responsible for secondary computing work. Alternatively, the server 120 is responsible for secondary computing work, and the terminals are responsible for primary computing work. Alternatively, collaborative computing is performed by using a distributed computing architecture between the server 120 and the terminals.

In a schematic example, the server 120 includes a processor 122, a user account database 123, a battle service module 124, and a user-oriented input/output (I/O) interface 125. The processor 122 is configured to load instructions stored in the server 121, and process data in the user account database 123 and the battle service module 124. The user account database 123 is used for storing data of user accounts used by the first terminal 110, the second terminal 140, and/or the another terminal 140, for example, profile pictures of the user accounts, nicknames of the user accounts, combat power indices of the user accounts, and service regions in which the user accounts are located. The battle service module 124 is configured to provide a plurality of battle rooms to users for a battle, for example, a 1V1 battle, a 3V3 battle, or a 5V5 battle. The user-oriented I/O interface 125 is configured to establish communication with the first terminal 110 and/or the second terminal 130 by using a wireless network or wired network to exchange data.

The server 120 may adopt a synchronization technology to make pictures presented by a plurality of clients consistent. Exemplarily, the synchronization technology adopted by the server 120 includes a state synchronization technology or a frame synchronization technology.

State Synchronization Technology

Figure 2:
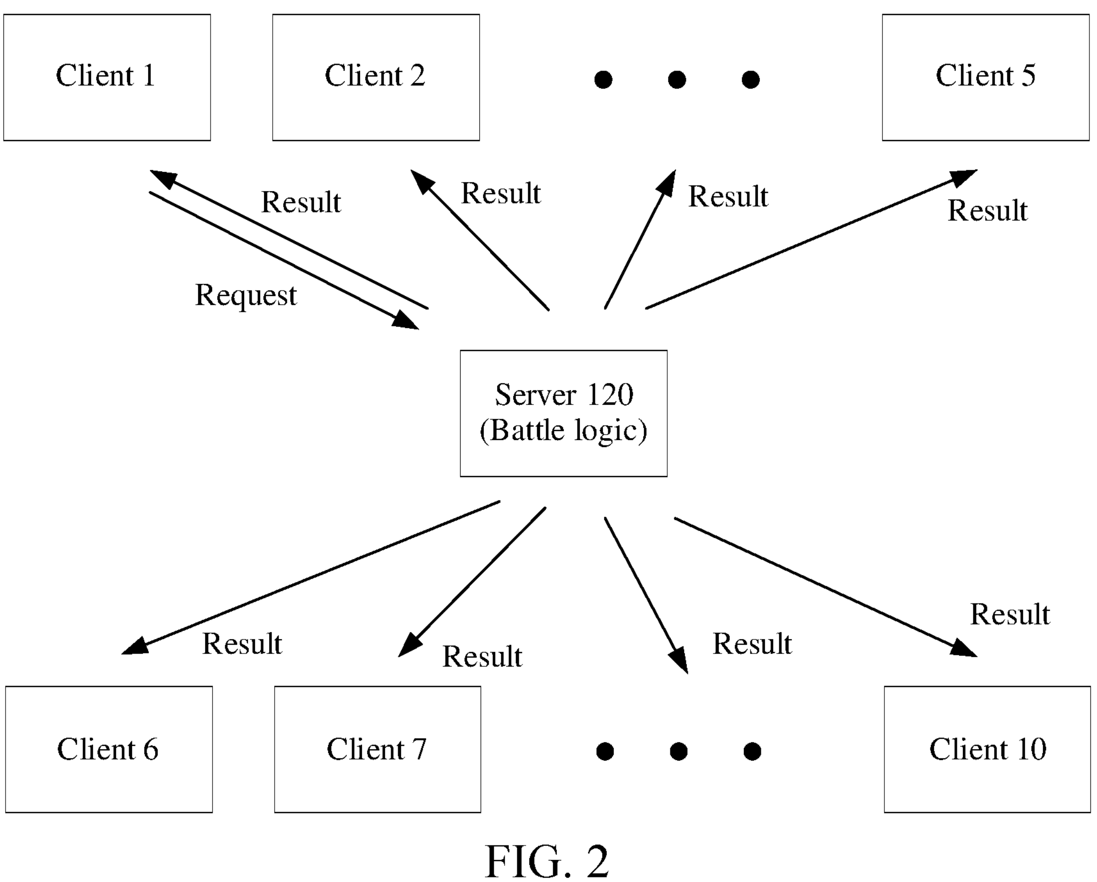
FIG. 2 is a schematic diagram of a state synchronization technology according to another exemplary embodiment of the present disclosure.

In an optional embodiment based on FIG. 1, the server 120 adopts a state synchronization technology to synchronize with a plurality of clients. In the state synchronization technology, as shown in FIG. 2, a battle logic runs in the server 120. When the status of a virtual character in the virtual environment changes, the server 120 transmits a status synchronization result to all the clients such as clients 1 to 10.

In an exemplary example, the client 1 transmits a request to the server 120 for requesting a virtual character 1 to cast a frost skill. The server 120 determines whether the frost skill is allowed to be cast, and a damage value to another virtual character 2 when the frost skill is allowed to be cast. Next, the server 120 transmits a skill cast result to all the clients, and all the clients update local data and interface presentation according to the skill cast result.

Frame Synchronization Technology

Figure 3:
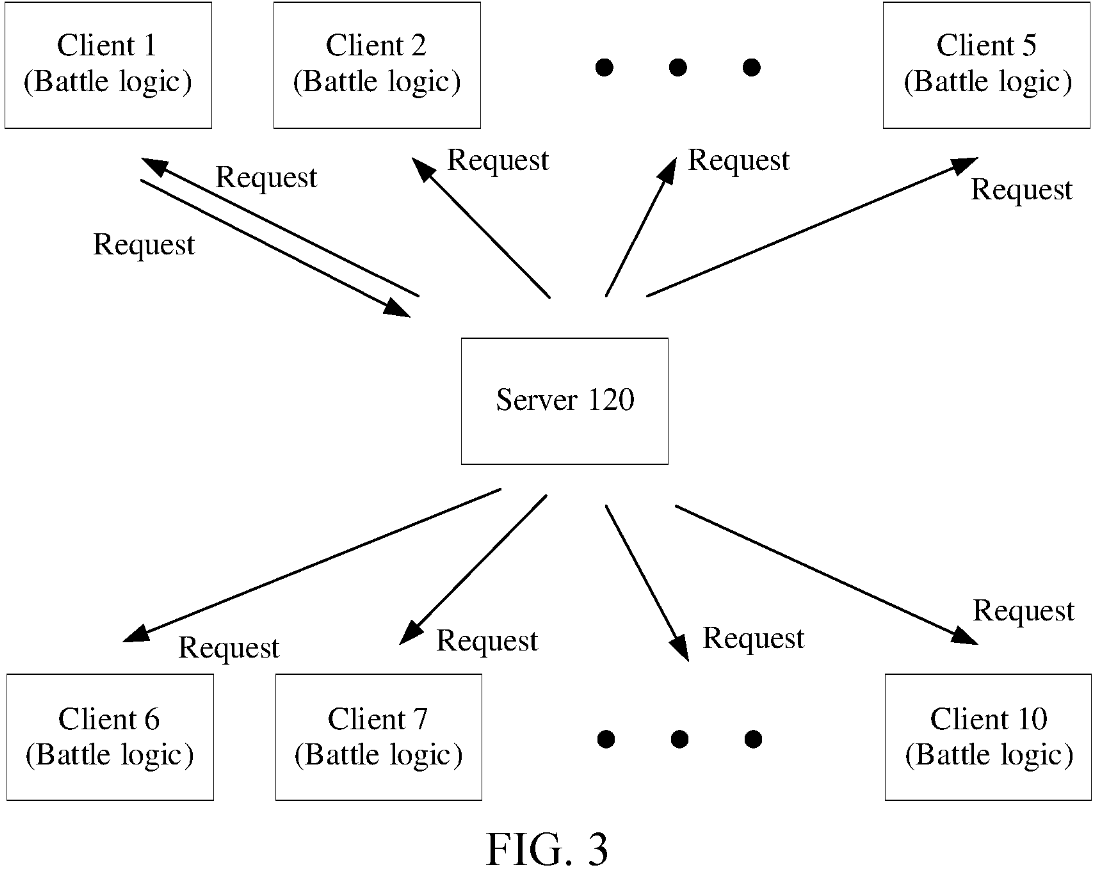
FIG. 3 is a schematic diagram of a frame synchronization technology according to another exemplary embodiment of the present disclosure.

In an optional embodiment based on FIG. 1, the server 120 adopts a frame synchronization technology to synchronize with a plurality of clients. In the frame synchronization technology, as shown in FIG. 3, a battle logic runs in the clients. Each client transmits a frame synchronization request to the server, and the frame synchronization request carries a local data change of the client. After the server 120 receives a frame synchronization request, the server forwards the frame synchronization request to all the clients. After receiving the frame synchronization request, each client processes the frame synchronization request according to a local battle logic, and updates local data and interface presentation.

The method for displaying a virtual environment picture provided by the embodiments of the present disclosure is described with reference to the above description of the virtual environment and the description of an implementation environment. Descriptions are made by using an example in which an execution body of the method is a client running on the terminal shown in FIG. 1. The terminal runs the client, and the client is an application that supports a virtual environment.

Schematically, an example in which the method for displaying a virtual environment picture provided in the present disclosure is applied to a MOBA game is used.

Figure 4:
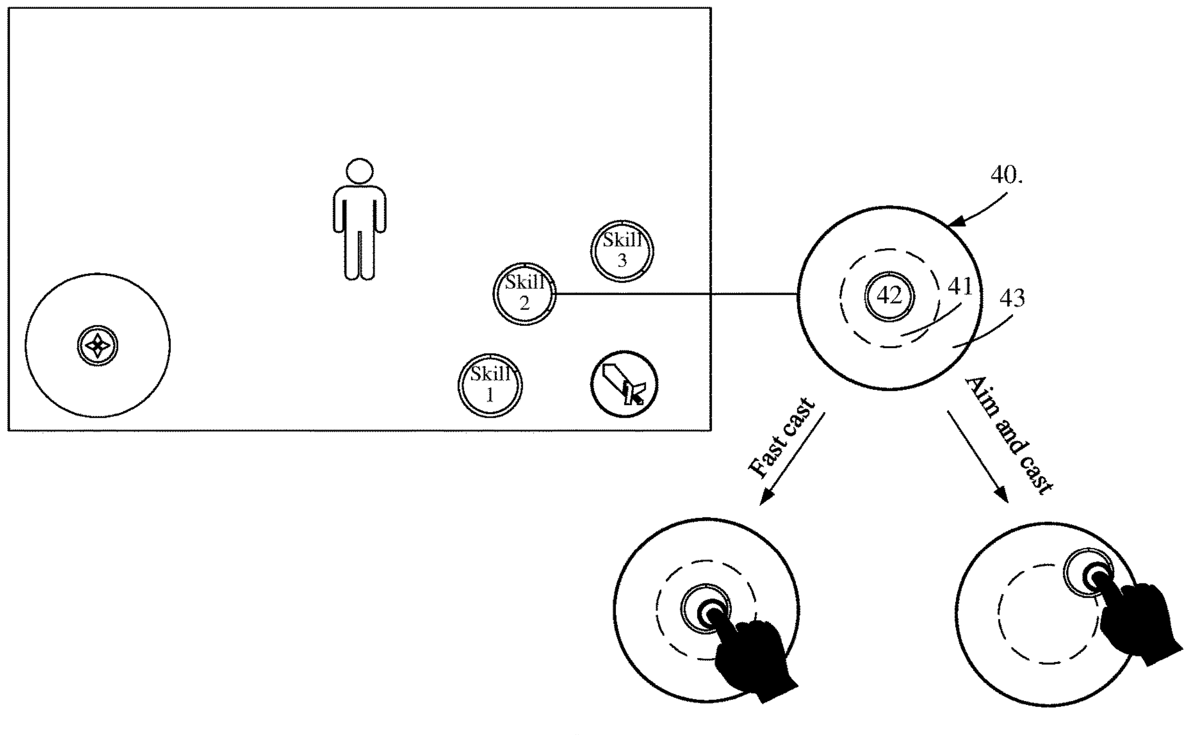
FIG. 4 is a schematic interface diagram of a method for displaying a virtual environment picture according to another exemplary embodiment of the present disclosure.

In the MOBA game, as shown in FIG. 4, a user may control, by controlling a wheel skill control, a first virtual character to cast a directional skill. The wheel skill control includes a wheel region 40 and a wheel button 42. The area of the wheel region 40 is larger than the area of the wheel button 42. The wheel button 42 is movable in the wheel region 40. Optionally, the wheel region 40 is divided into an inner circle region 41 and an outer circle region 43. The inner circle region 41 is also referred to as a dead zone.

When the user clicks the wheel button 42 in the inner circle region 41, a fast spell casting mode (also referred to as fast spell casting or automatic spell casting) is triggered. The fast spell casting mode refers to that the client automatically selects, according to a default attack-object selection rule, a second virtual character within a circular cast range centered on the first virtual character. When a finger of the user leaves the wheel button 42, the client controls the first virtual character to cast the directional skill to the second virtual character.

When the user clicks the wheel button 42 and drags the wheel button 42 into the outer circle region 43, an aiming and casting mode is triggered. The aiming and casting mode refers to displaying a skill indicator and a range indicator according to a position of the wheel button 42 in the outer circle region 43 by using the first virtual character as a reference. The skill indicator is configured to indicate at least one of a cast direction and an action region of the skill. The range indicator is configured to indicate a maximum cast range of the directional skill. The user may change the position of the wheel button 42 in the outer circle region 43 to further change a display position of the skill indicator within the circular cast range. When the finger of the user leaves the wheel button 42, the client controls the first virtual character to cast the directional skill to a direction or a region indicated by the skill indicator.

In this embodiment of the present disclosure, the following improvements are provided.

Figure 5:
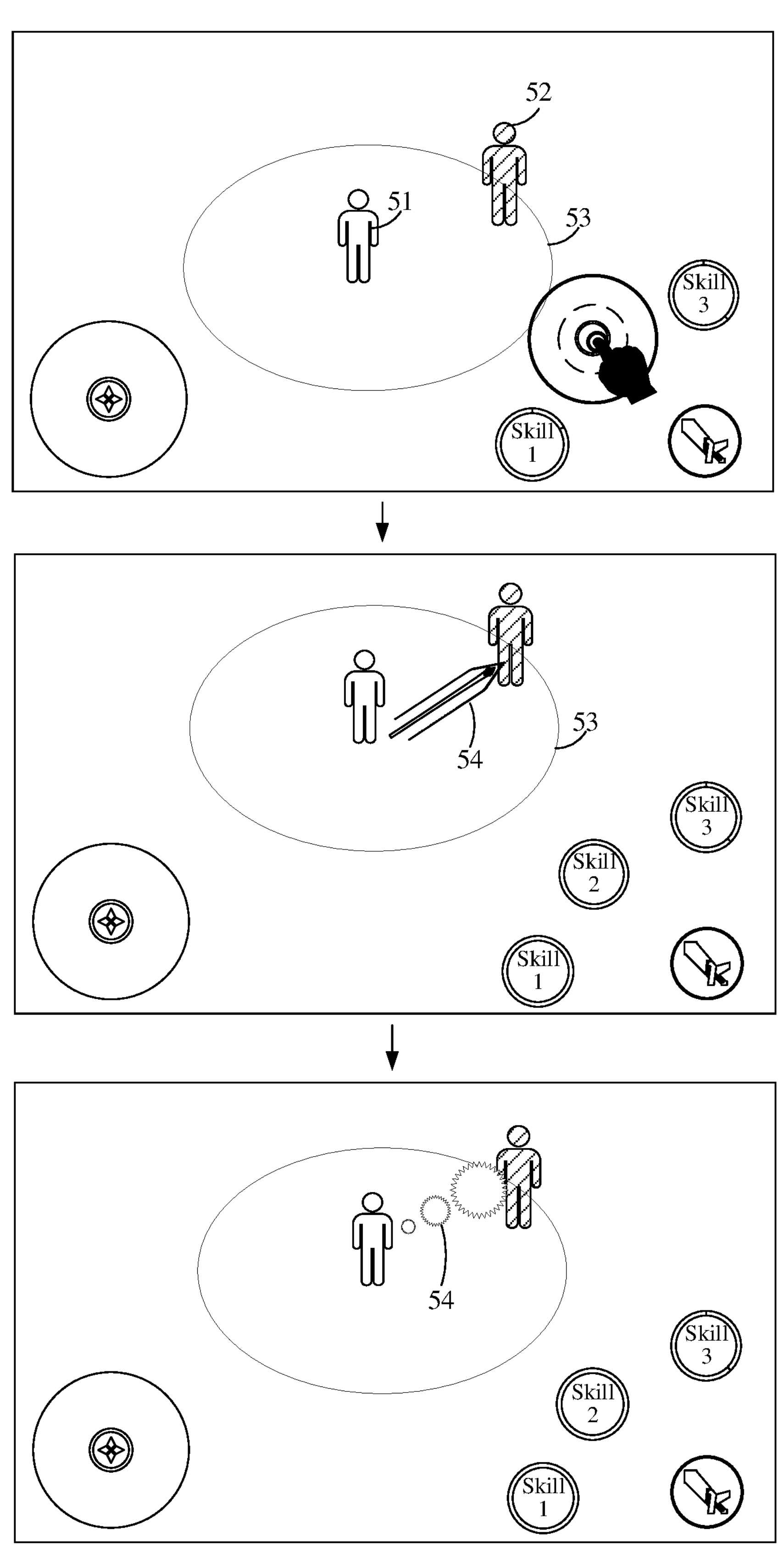
FIG. 5 is a schematic interface diagram of a method for displaying a virtual environment picture according to another exemplary embodiment of the present disclosure.

Improvement 1: As shown in FIG. 5, when the user clicks the wheel button in the inner circle region to trigger a fast spell casting mode of a first virtual character 51, the client selects a second virtual character 52 according to a default or customized attack-object selection rule. While the user clicks the wheel button, the client terminal displays a range indicator 53 and does not display a skill indicator 54 in an UI. That is, because the user does not aim by himself, there is no need to display the skill indicator 54, thereby minimizing interference information in the UI.

Improvement 2: After the finger of the user leaves the wheel button and in a short period of time before a skill of the first virtual character 51 is cast, the skill indicator 54 is displayed in the UI, and the skill indicator 54 points from the first virtual character 51 to the second virtual character 52. In this case, the skill indicator 54 is displayed in green.

Improvement 3: When the directional skill is in a disabled (interrupted) state or a cooling state, if the user clicks the wheel button, the skill indicator 54 is displayed in red (which is differentiated by using different display styles in FIG. 5).

Figure 6:
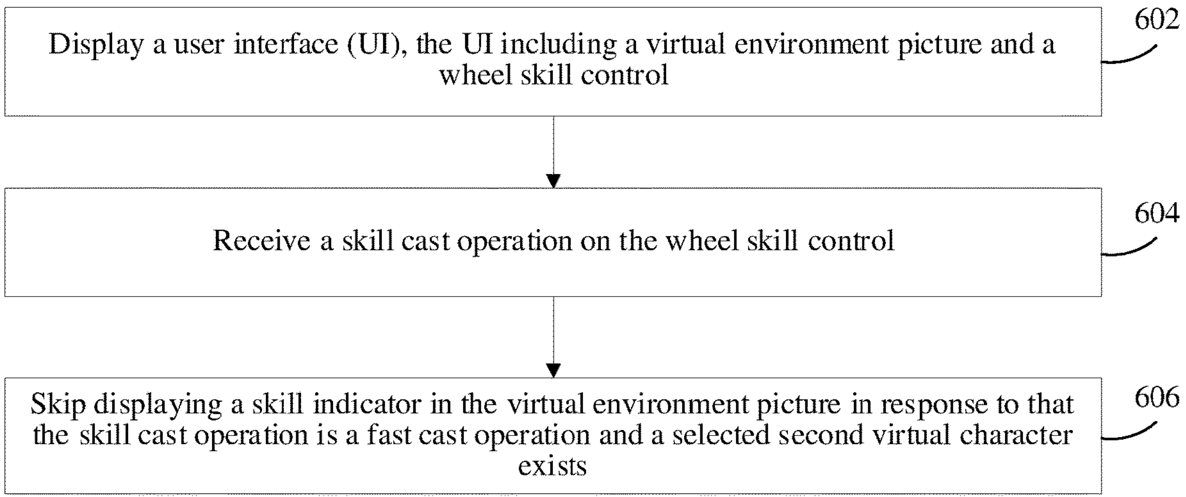
FIG. 6 is a flowchart of a method for displaying a virtual environment picture according to another exemplary embodiment of the present disclosure.

FIG. 6 is a flowchart of a method for displaying a virtual environment picture according to an exemplary embodiment of the present disclosure. This embodiment is described by using an example in which the method is applied to a client. That is, the method is performed by the client. The method includes:

Step 602: Display a UI, the UI including a virtual environment picture and a wheel skill control.

The virtual environment picture is a picture obtained by observing a virtual environment from an observing perspective corresponding to a first virtual character. Exemplarily, the virtual environment picture is a two-dimensional picture displayed on the client after picture acquisition is performed on the three-dimensional virtual environment. Exemplarily, the shape of the virtual environment picture is determined according to the shape of a display screen of a terminal, or according to the shape of the UI of the client. In an example in which the display screen of the terminal is rectangular, the virtual environment picture is also displayed as a rectangular picture.

A camera model bound to the first virtual character is provided in the virtual environment. The virtual environment picture is a picture captured by the camera model with a specific observation position in the virtual environment as an observation center. The observation center is the center of the virtual environment picture. In an example in which the virtual environment picture is a rectangular picture, an intersection of rectangle diagonals in the virtual environment picture is the observation center. Generally, the camera model bound to the first virtual character uses the first virtual character as the observation center, and a position of the first virtual character in the virtual environment is the observation position. The observation position is a coordinate position in the virtual environment. When the virtual environment is a three-dimensional virtual environment, the observation position is three-dimensional coordinates. Exemplarily, if the ground in the virtual environment is a horizontal plane, a height coordinate of the observation position is 0, and the observation position may be approximated as two-dimensional coordinates on the horizontal plane.

The first virtual character is a virtual character controlled by the client. The client controls activities of the first virtual character in the virtual environment according to received user operations (or man-machine operations). Exemplarily, the activities of the first virtual character in the virtual environment include: walking, running, jumping, climbing, getting down, attacking, casting a skill, picking up a prop, and transmitting a message.

A skill is an ability that is used or cast by a virtual character to attack the virtual character and/or another virtual character and generate a debuff or a buff. Classified according to action ranges, skills include directional skills and undifferentiated coverage skills. The directional skill is a skill cast toward an aimed direction or an aimed region in a maximum action range. The undifferentiated coverage skill is a skill cast toward all regions in a maximum action range. Classified according to types, skills include active skills and passive skills. The active skill is a skill that is actively used or cast by a virtual character. The passive skill is a skill that is automatically triggered when a passive condition is met.

Exemplarily, the directional skill mentioned in this embodiment is an active skill that is actively used and cast by the first virtual character controlled by the user.

The wheel skill control is a man-machine interaction control configured to cast a directional skill. As shown in FIG. 4, the wheel skill control includes a wheel region 40 and a wheel button 42. The area of the wheel region 40 is larger than the area of the wheel button 42. The wheel button 42 is movable in the wheel region 40. Optionally, the wheel region 40 is divided into an inner circle region 41 and an outer circle region 43. The inner circle region 41 is also referred to as a dead zone.

Step 604: Receive a skill cast operation on the wheel skill control.

The skill cast operation is a man-machine operation that acts on the wheel skill control. The skill cast operation includes but is not limited to at least one of clicking, dragging, floating touch, and force touch.

When the skill cast operation is located in the inner circle region 41, the skill cast operation belongs to a fast cast operation. When the skill cast operation is located in the outer circle region 43, the skill cast operation belongs to an aiming and casting operation. The outer circle region 43 is located outside the inner circle region 41. The wheel button 42 is located at the center of the inner circle region 41 by default, and can move with the movement of the skill cast operation.

Step 606: Skip displaying a skill indicator in the virtual environment picture in response to that the skill cast operation is a fast cast operation and a selected second virtual character exists.

When the client identifies that the skill cast operation is a fast cast operation, the client selects the second virtual character from virtual characters in a maximum action range according to a default or customized attack-object selection rule. Exemplarily, there are one or more second virtual characters.

In response to that the selected second virtual character exists, the client displays the range indicator and does not display the skill indicator in the virtual environment picture. The range indicator is a control configured to indicate a maximum action range of a directional skill, and the skill indicator is configured to indicate a direction and/or cast region of a directional skill.

The skipping displaying a skill indicator includes any one of skipping rendering the skill indicator, skipping activating the skill indicator, setting the skill indicator to transparent, and setting a display level of the skill indicator to low (covered by a high display level).

According to different directional skills, skill indicators include arrow skill indicators and regional skill indicators.

Figure 7:
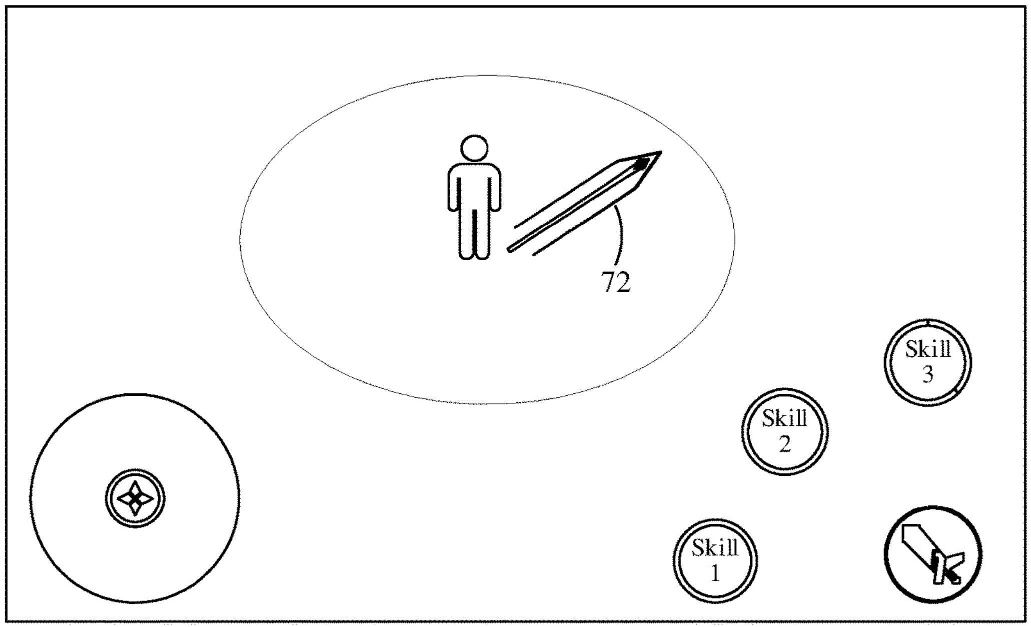
FIG. 7 is a schematic diagram of an arrow skill indicator according to another exemplary embodiment of the present disclosure.

The arrow skill indicator is a control for indicating a direction of a directional skill. The arrow skill indicator is displayed in the form of an arrow. FIG. 7 schematically shows an arrow skill indicator 72.

Figure 8:
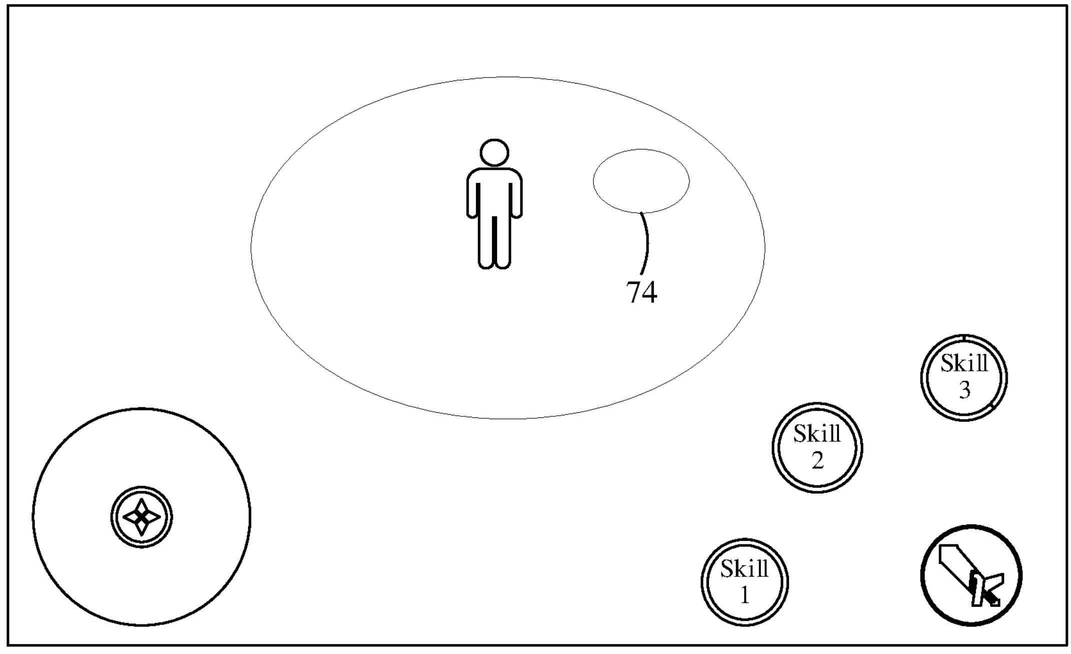
FIG. 8 is a schematic diagram of a regional skill indicator according to another exemplary embodiment of the present disclosure.

The regional skill indicator is a control for indicating a direction and a cast region of a directional skill. The regional skill indicator is displayed in the form of at least one of a circle, a line segment, a triangle, a hexagon, and a fan. FIG. 8 schematically shows a circle-shaped regional skill indicator 74.

Based on the above, in the method provided by this embodiment, when a skill cast operation on a wheel skill control is a fast cast operation, a first virtual character is used as a reference position in a virtual environment picture to display a range indicator, and a skill indicator is not displayed. Because a second virtual character is not selected by a user but selected by a client according to a default attack-object selection rule, the no display of the skill indicator does not affect a normal skill cast and can further reduce impact and interference of the skill indicator on a visual field of the user, thereby increasing a percentage of effective information in the visual field of the user.

Figure 9:
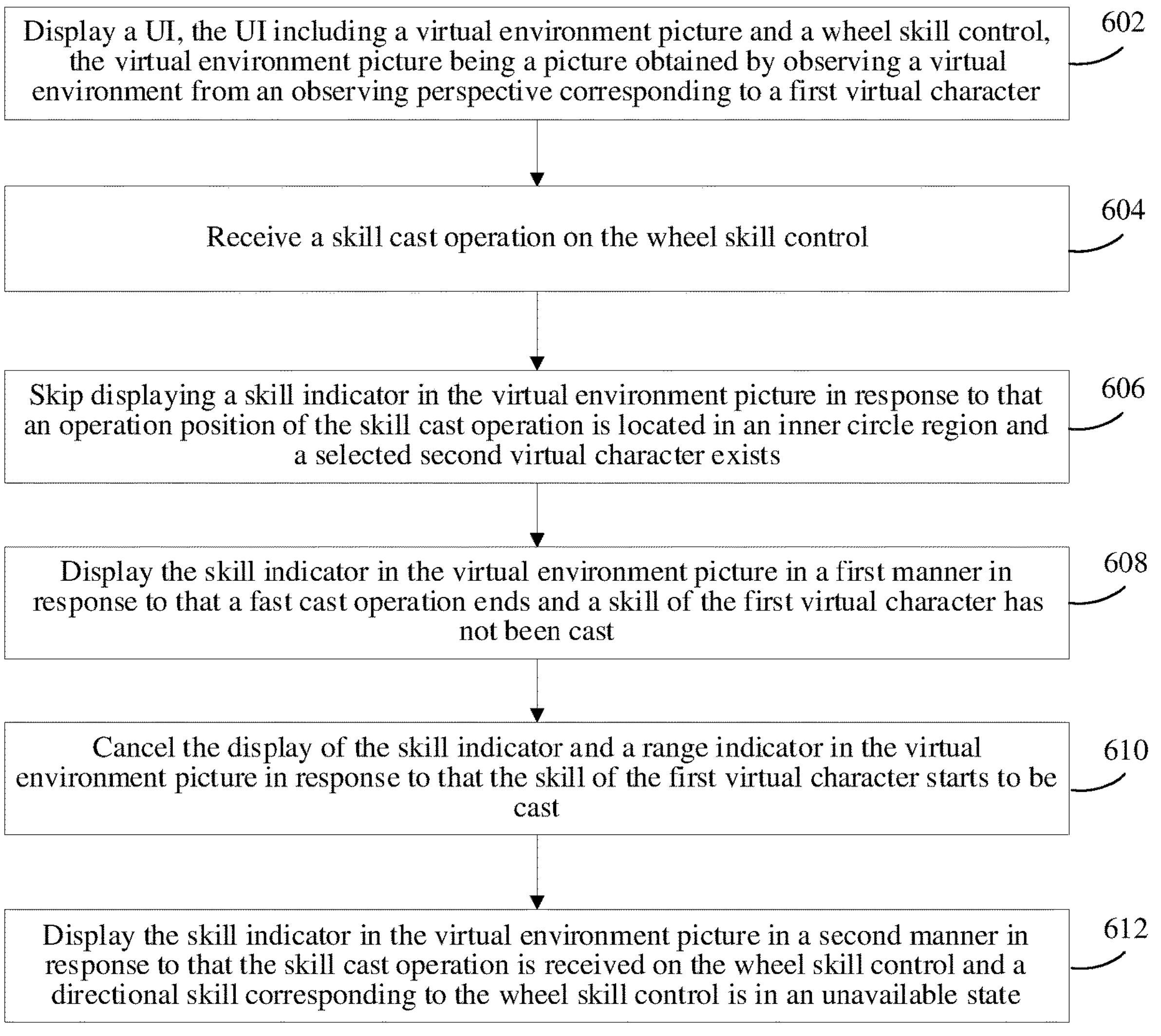
FIG. 9 is a flowchart of a method for displaying a virtual environment picture according to another exemplary embodiment of the present disclosure.

FIG. 9 is a flowchart of a method for displaying a virtual environment picture according to another exemplary embodiment of the present disclosure. This embodiment is described by using an example in which the method is applied to a client. That is, the method is performed by the client. The method includes:

Step 602: Display a UI, the UI including a virtual environment picture and a wheel skill control, the virtual environment picture being a picture obtained by observing a virtual environment from an observing perspective corresponding to a first virtual character.

The observing perspective corresponding to the first virtual character is an observing perspective with the first virtual character as an observation reference, and may be a perspective with the first virtual character as an observation center, or a perspective with the first virtual character as a main observation object.

The wheel skill control is a man-machine interaction control configured to cast a directional skill. The wheel skill control includes a wheel region and a wheel button. The wheel region is divided into an inner circle region and an outer circle region. The inner circle region is used for triggering a fast cast operation, and the outer circle region is used for triggering an aiming and casting operation.

Both the fast cast operation and the aiming and casting operation belong to skill cast operations. The fast cast operation is an operation of triggering the client (or a server) to automatically select the second virtual character according to a default or customized attack-object selection rule. The aiming and casting operation is an operation of manually selecting the second virtual character according to a direction and/or region aimed by a user.

Step 604: Receive a skill cast operation on the wheel skill control.

The skill cast operation is a man-machine operation that acts on the wheel skill control. The skill cast operation includes but is not limited to at least one of clicking, dragging, floating touch, and force touch.

When the skill cast operation is located in the inner circle region, the skill cast operation belongs to a fast cast operation. When the skill cast operation is located in the outer circle region, the skill cast operation belongs to an aiming and casting operation. The outer circle region is located outside the inner circle region. The wheel button is located at the center of the inner circle region by default, and can move with the movement of the skill cast operation.

Step 606: Skip displaying a skill indicator in the virtual environment picture in response to that an operation position of the skill cast operation is located in the inner circle region and a selected second virtual character exists.

Schematically, there are one or more second virtual characters. The client does not display the skill indicator in the virtual environment picture in response to that the operation position of the skill cast operation is located in the inner circle region and there is one selected second virtual character.

The operation position or continuous touch position of the skill cast operation is located in the inner circle region, which represents that the skill cast operation is a fast cast operation. When the client identifies that the skill cast operation is a fast cast operation, the client selects the second virtual character from virtual characters in a maximum action range according to a default or customized attack-object selection rule.

Exemplarily, the attack-object selection rule includes the following: an opponent hero object that is attacking the first virtual character>an opponent hero object that is attacking a friendly virtual character>an opponent hero that does not attack the first virtual character or a friendly hero object>an opponent soldier object that is attacking the first virtual character>an opponent soldier object that is attacking a friendly virtual character>an opponent soldier object that does not attack the first virtual character or a friendly virtual character>a neutral creature object that is attacking the first virtual character>a neutral creature object that is attacking a friendly virtual character>a neutral creature object that does not attack the first virtual character and a friendly virtual character.

The client displays the skill indicator in the virtual environment picture in response to that the operation position of the skill cast operation is located in the inner circle region and there is one selected second virtual character.

The client displays the skill indicator in the virtual environment picture in response to that the operation position of the skill cast operation is located in the inner circle region and there are two or more selected second virtual characters, or in response to that the operation position of the skill cast operation is located in the inner circle region and no selected second virtual character exists, or in response to that the operation position of the skill cast operation is located in the outer circle region.

Optionally, in response to receiving the skill cast operation, regardless of whether the skill cast operation is a fast cast operation or an aiming and casting operation, the client displays a range indicator in the virtual environment picture.

Step 608: Display the skill indicator in the virtual environment picture in a first manner in response to that the fast cast operation ends and a skill of the first virtual character has not been cast.

In an example in which a frame synchronization technology is adopted between the server and the client, when the user casts the wheel button, the fast cast operation ends. In response to that the fast cast operation ends, the client transmits a frame synchronization request (packet sending for short) to the server, and the server forwards the frame synchronization request (packet back) to all clients in a battle. The client only starts to control, after receiving the frame synchronization request sent back by the server, the first virtual character to cast a directional skill.

Therefore, there is a relatively short period of time between "the end of the fast cast operation" and "the cast of the directional skill by the first virtual character". In such a relatively short period of time, the client displays the skill indicator in the virtual environment picture in the first manner. One end of the skill indicator is the first virtual character, and the other end (or the middle part) of the skill indicator is the second virtual character. That is, the skill indicator points to the second virtual character.

The first manner includes at least one of the following: displaying in a first color, displaying in a first style, and displaying with a first special effect. For example, the skill indicator is displayed in green.

The color refers to the color of the skill indicator, the style refers to the shape of the skill indicator, and the special effect refers to an animation special effect of the skill indicator.

Step 610: Cancel the display of the skill indicator and the range indicator in the virtual environment picture in response to that the skill of the first virtual character starts to be cast.

Step 612: Display the skill indicator in the virtual environment picture in a second manner in response to that the skill cast operation is received on the wheel skill control and the directional skill corresponding to the wheel skill control is in an unavailable state.

That the directional skill is in an unavailable state includes at least one of the following:

1. The directional skill is in a state of being interrupted by another skill. The another skill is a higher-priority skill, or a skill that has an interrupt function, or a skill that has a daze function, or a skill that has a function of prohibiting spell casting.
2. The directional skill is in a cooling state. Most directional skills have a cooling time or an energy storage time. After a cooling state of a cooling time, the directional skill is available.

When the directional skill corresponding to the wheel skill control is in an unavailable state, in response to that the skill cast operation is received on the wheel skill control, the skill indicator is displayed in the virtual environment picture in the second manner.

The second manner includes at least one of the following: displaying in a second color, displaying in a second style, and displaying with a second special effect. For example, the skill indicator is displayed in red.

The first color is different from the second color, the first style is different from the second style, and the first special effect is different from the second special effect.

Based on the above, in the method provided by this embodiment, when a skill cast operation on a wheel skill control is a fast cast operation, a first virtual character is used as a reference position in a virtual environment picture to display a range indicator, and a skill indicator is not displayed. Because a second virtual character is not selected by a user but selected by a client according to a default attack-object selection rule, the no display of the skill indicator does not affect a normal skill cast and can further reduce impact and interference of the skill indicator on a visual field of the user, thereby increasing a percentage of effective information in the visual field of the user.

In the method provided in this embodiment, when the fast cast operation ends and the skill of the first virtual character has not been cast, the skill indicator is displayed in the virtual environment picture in the first manner, for example, the skill indicator is displayed in green, thereby reducing the impact and interference of the skill indicator on the visual field of the user, reminding the user of a cast target of the cast and the effectiveness of the operation.

In the method provided in this embodiment, the skill indicator in the virtual environment picture is further displayed in the second manner in response to that the skill cast operation is received on the wheel skill control and the directional skill corresponding to the wheel skill control is in an unavailable state, thereby intuitively reminding the user that the directional skill is in an unavailable state, reducing the information obtaining difficulty for the user, and improving the man-machine interaction efficiency.

Figure 10:
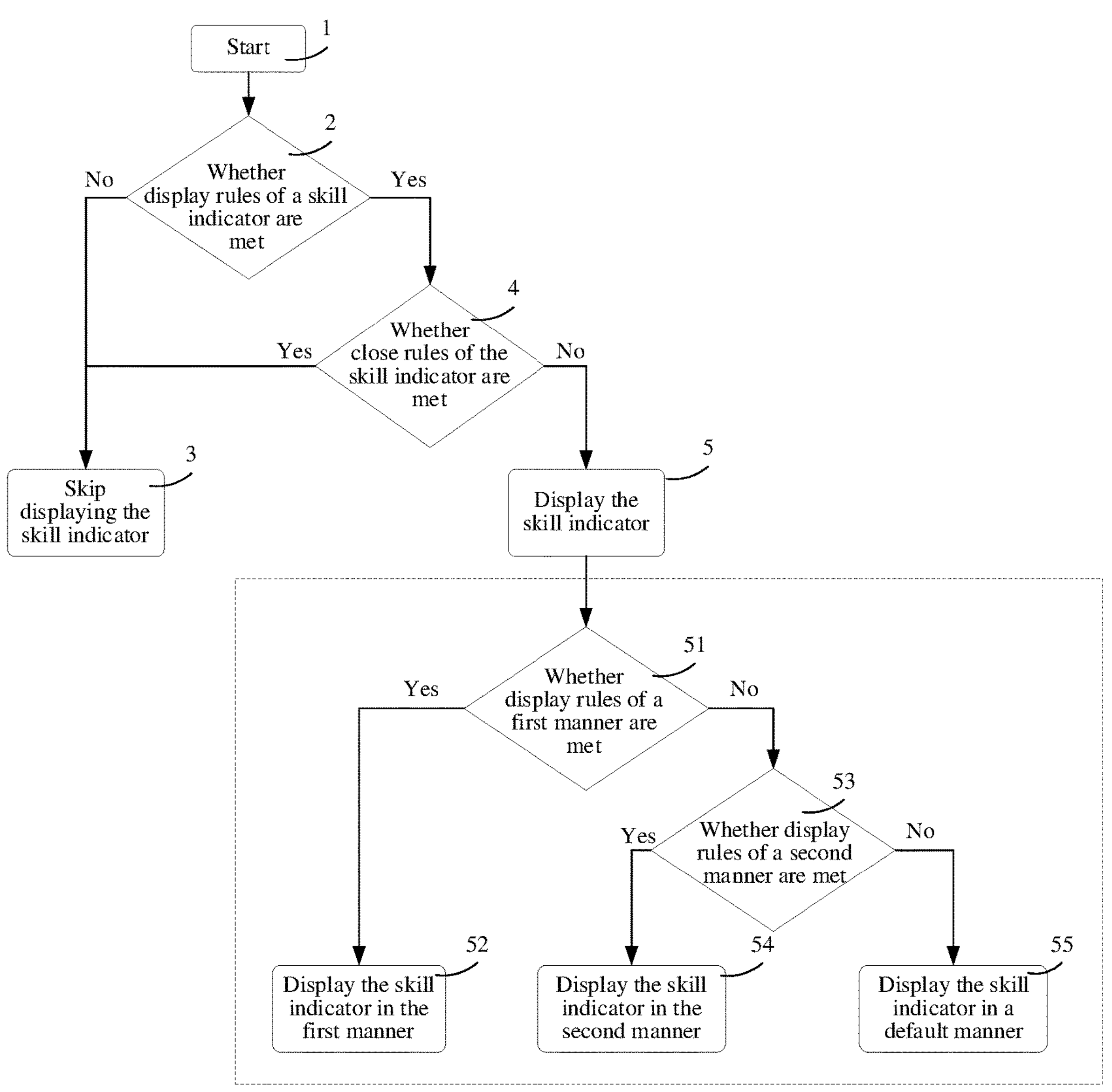
FIG. 10 is a flowchart of a method for displaying a virtual environment picture according to another exemplary embodiment of the present disclosure.

FIG. 10 is a display logic diagram of a skill indicator shown in an exemplary embodiment of the present disclosure. A display logic of the skill indicator includes:

Step 1: Start.

Step 2: Whether display rules of the skill indicator are met.

When the display rules are not met, step 3 is performed. When the display rules are met, step 4 is performed.

The display rules include at least one group of the following rules:

1. A skill cast operation is received; the skill cast operation is a fast cast operation; and there are two or more selected second virtual characters;
2. A skill cast operation is received; the skill cast operation is a fast cast operation; and there is no selected second virtual character;
3. A skill cast operation ends; the skill cast operation is a fast cast operation; and there is one selected second virtual character, and a directional skill has not been cast yet; and
4. A skill cast operation is received; and the skill cast operation is an aiming and casting operation.

Step 3: Skip displaying the skill indicator.

Step 4: Whether close rules of the skill indicator are met; if yes, step 3 is performed, or if not, step 5 is performed.

The close rules include at least one group of the following rules:

1. A skill cast operation ends; the skill cast operation is a fast cast operation; and there are two or more selected second virtual characters;
2. A skill cast operation ends; the skill cast operation is a fast cast operation; and there is no selected second virtual character;
3. A skill cast operation is a fast cast operation; and there is one selected second virtual character, and a directional skill starts to be cast; and
4. A skill cast operation ends; and the skill cast operation is an aiming and casting operation.

Step 5: Display the skill indicator.

Step 51: Whether display rules of a first manner are met; if yes, step 52 is performed, or if not, step 53 is performed.

The display rules of the first manner include: a skill cast operation ends; the skill cast operation is a fast cast operation; and there is one selected second virtual character, and a directional skill has not been cast yet.

Step 52: Display the skill indicator in the first manner.

Optionally, the first manner refers to that the skill indicator is displayed in green.

Step 53: Whether display rules of a second manner are met; if yes, step 54 is performed, or if not, step 55 is performed.

The display rules of the second manner include: a skill cast operation is received, and a directional skill is in an unavailable state.

Step 54: Display the skill indicator in the second manner.

Optionally, the second manner refers to that the skill indicator is displayed in red.

Step 55: Display the skill indicator in a default manner.

FIG. 11 shows a schematic configuration file of a skill indicator, and one configuration file includes a plurality of components 1100. FIG. 11 shows a component 1100. Each component 1100 is configured to configure a complete indicator effect, and one skill indicator can be obtained by superimposing a plurality of indicator effects.

Configuration items of the component 1100 include but are not limited to at least one of an activity type, rules, a component path, displaying a coverage effect, displaying a selected target effect, a minimap indicator, a shadow type, stopping following when a button is released, a position-following type, a forward-following type, an outer circle radius, an inner circle radius, a position offset, an offset following type, a following offset angle, a dynamic type, and using orange.

The "component path" may specify different skill indicator resources to display different resources, for example, a circular skill range box or a skill cast direction arrow. A Rule field is very important in the component 1100, which configures at least one of display rules, close rules, and color rules of the component 1100.

Figure 12:
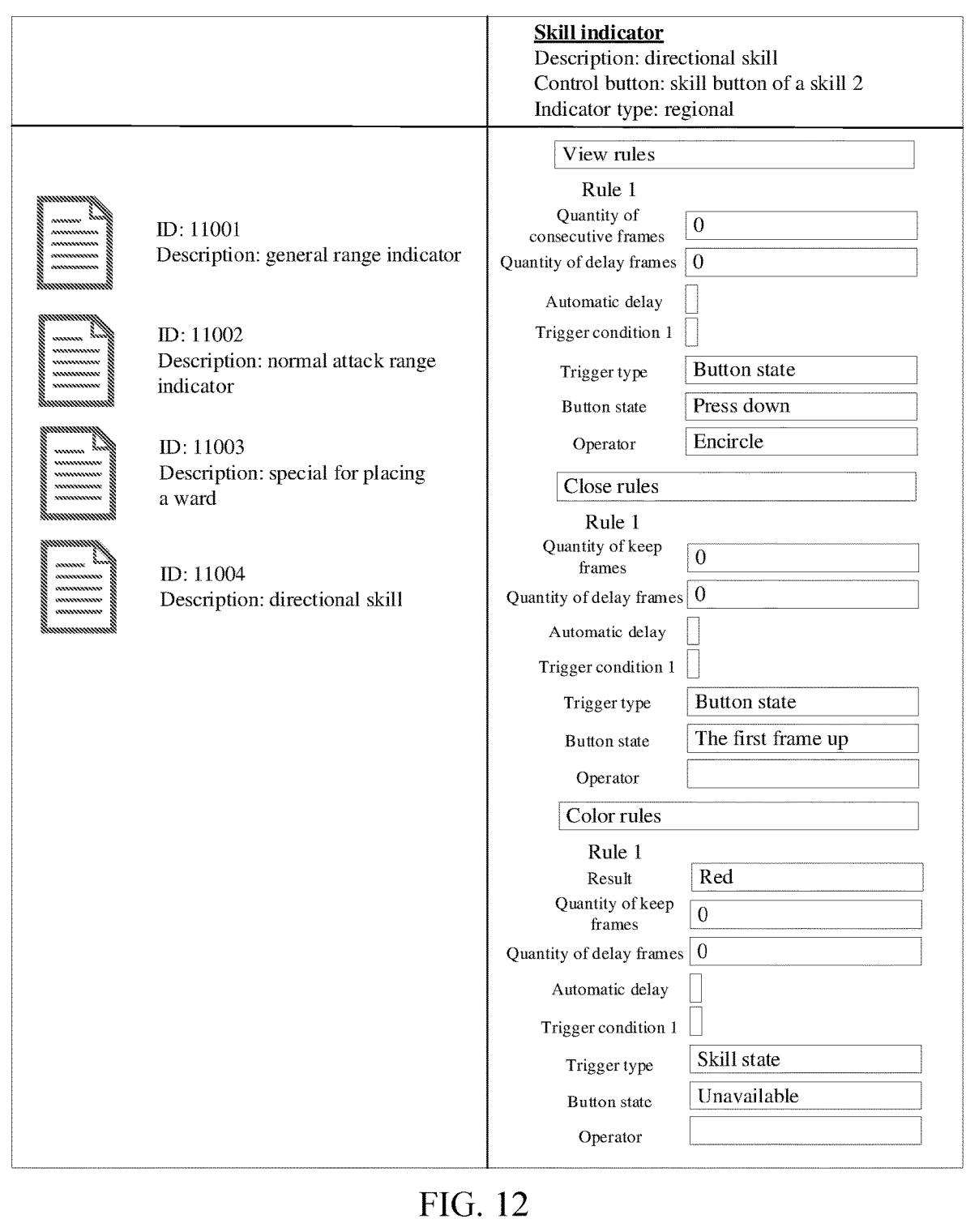

The display rules of one component 1100 may be combined by a plurality of rules in an AND/OR manner to implement complex combination rules. Each group of complex combination rules may be illustrated by a description file, such as a description file 11001, a description file 11002, a description file 11003, and a description file 11004 in FIG. 12. Using the description file 11004 as an example, rules of a schematic skill indicator include three primary rules: a display rule, a close rule, and a color rule. Each rule includes a plurality of sub-rules, and a plurality of trigger conditions may be set in each sub-rule. A logic ("and" or "or") relationship may be set between the trigger conditions. Each rule returns a true or false result. A display rule of a component combines true/false results of all rules by using a logical relationship, to control a final result of the display rule.

The above display rule and the close rule jointly control the display of the skill indicator (the skill indicator is only displayed when the display rule is true and the close rule is false), and the color rule controls a color change of the skill indicator. In a schematic example, a display rule of an arrow skill indicator includes:

a display rule: a button is down or is dragged.

a close rule: a frame after the button is up.

color change:

red: the skill is disabled or a button is dragged to a cancel button; or green: the button is up.

Figure 13:
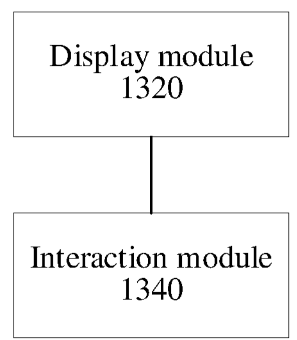
FIG. 13 is a block diagram of an apparatus for displaying a virtual environment picture according to another exemplary embodiment of the present disclosure.

FIG. 13 is a block diagram of an apparatus for displaying a virtual environment picture according to an exemplary embodiment of the present disclosure. The apparatus includes:

a display module 1320, configured to display a UI, the UI including a virtual environment picture and a wheel skill control, the virtual environment picture being a picture obtained by observing a virtual environment from an observing perspective corresponding to a first virtual character, and the wheel skill control being a control configured to cast a directional skill; and an interaction module 1340, configured to receive a skill cast operation on the wheel skill control, the display module 1320 being configured to skip displaying a skill indicator in the virtual environment picture in response to that the skill cast operation is a fast cast operation and a selected second virtual character exists, the skill indicator being configured to indicate at least one of an aiming direction of the directional skill and a cast region.

In a schematic example, the wheel skill control includes: an inner circle region and an outer circle region located outside the inner circle region; and the display module 1320 is configured to skip displaying the skill indicator in the virtual environment picture in response to that an operation position of the skill cast operation is located in the inner circle region and the selected second virtual character exists.

In a schematic example, the display module 1320 is configured to skip displaying the skill indicator in the virtual environment picture in response to that the operation position of the skill cast operation is located in the inner circle region and there is one candidate second virtual character in a range indicator.

In a schematic example, the display module 1320 is configured to display the skill indicator in the virtual environment picture in response to that the operation position of the skill cast operation is located in the inner circle region and two or more selected second virtual characters exist; or the display module 1320 is configured to display the skill indicator in the virtual environment picture in response to that the operation position of the skill cast operation is located in the outer circle region.

In a schematic example, the display module 1320 is configured to display the skill indicator in the UI in response to that the fast cast operation ends and a skill of the first virtual character has not been not cast, the skill indicator pointing to the second virtual character.

In a schematic example, the display module 1320 is configured to display the skill indicator in the virtual environment picture in a first manner, the first manner including at least one of the following: displaying in a first color, displaying in a first style, and displaying with a first special effect.

In a schematic example, the display module 1320 is configured to display the skill indicator in the virtual environment picture in a second manner in response to that the skill cast operation is received on the wheel skill control and the directional skill corresponding to the wheel skill control is in an unavailable state, the second manner including at least one of the following: displaying in a second color, displaying in a second style, and displaying with a second special effect.

In a schematic example, the skill indicator includes an arrow skill indicator or a range skill indicator.

The apparatus for displaying a virtual environment picture provided in the foregoing embodiments is illustrated with an example of division of the foregoing functional modules. In actual application, the functions may be allocated to and completed by different functional modules according to requirements, that is, the internal structure of the device is divided into different functional modules, to implement all or some of the functions described above. In addition, the apparatus for displaying a virtual environment picture provided in the foregoing embodiment belongs to the same concept as the method embodiment of displaying a virtual environment picture. For a specific implementation process of the apparatus, refer to the method embodiment. Details are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The present disclosure further provides a computer device (a terminal or a server), including a processor and a memory, the memory storing at least one instruction, the at least one instruction being loaded and executed by the processor to implement method for displaying a virtual environment picture provided in the foregoing method embodiments. The computer device may be a computer device provided in FIG. 14.

Figure 14:
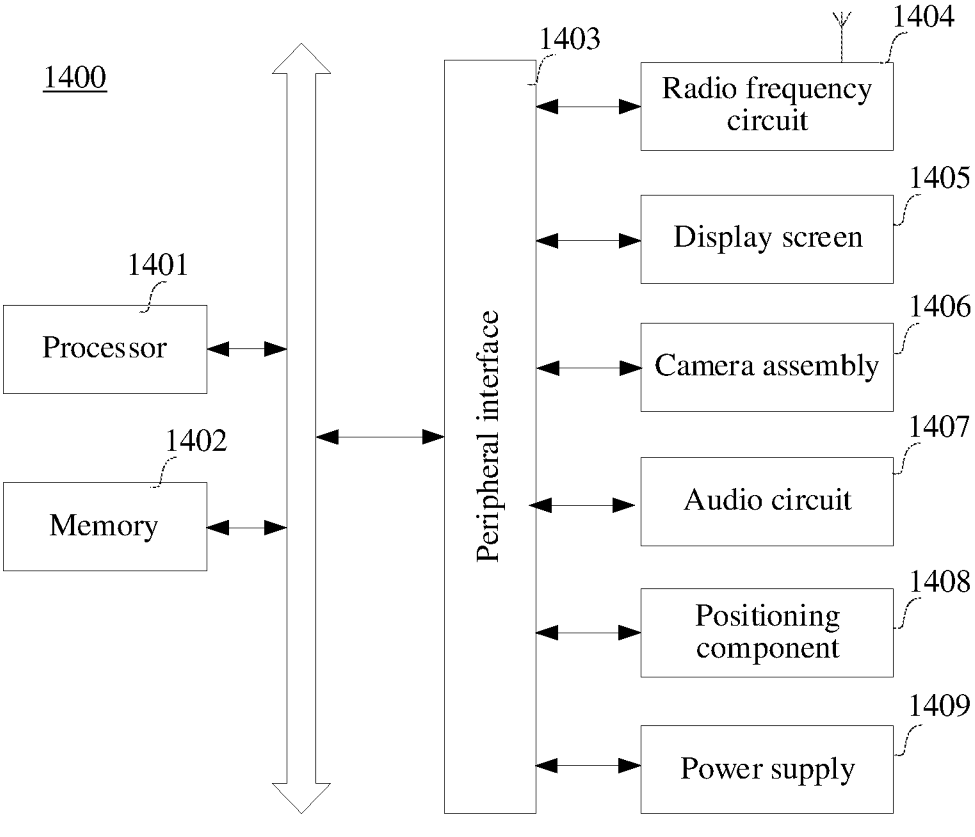
FIG. 14 is a block diagram of a computer device according to another exemplary embodiment of the present disclosure.

FIG. 14 is a structural block diagram of a computer device 1400 according to an exemplary embodiment of the present disclosure. The computer device 1400 may be a terminal such as a smartphone, a tablet computer, an MP3 player, an MP4 player, a notebook computer, or a desktop computer. The computer device 1400 may also be referred to as user equipment (UE), a terminal device, a portable computer device, a laptop computer device, a desktop computer device, or another name.

Generally, the computer device 1400 includes a processor 1401 and a memory 1402.

The processor 1401 may include one or more processing cores, and may be, for example, a 4-core processor or an 8-core processor. The processor 1401 may be implemented by using at least one hardware form of digital signal processor (DSP), a field-programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1401 may be integrated with a graphics processing unit (GPU). The GPU is responsible for rendering and drawing content to be displayed by a display screen. In some embodiments, the processor 1401 may further include an artificial intelligence (AI) processor. The AI processor is configured to process a calculation operation related to machine learning.

The memory 1402 may include one or more computer-readable storage media that may be non-transitory. The memory 1402 may further include a high-speed random access memory and a non-volatile memory, for example, one or more disk storage devices or flash storage devices. In some embodiments, the non-transient computer-readable storage medium in the memory 1402 is configured to store at least one instruction, the at least one instruction being configured to be executed by the processor 1401 to implement the method for displaying a virtual environment picture provided in the method embodiments of the present disclosure.

In some embodiments, the computer device 1400 further optionally includes a peripheral interface 1403 and at least one peripheral. The processor 1401, the memory 1402, and the peripheral interface 1403 may be connected by a bus or a signal line. Each peripheral may be connected to the peripheral interface 1403 by using a bus, a signal cable, or a circuit board. Specifically, the peripheral includes at least one of a radio frequency (RF) circuit 1404, a display screen 1405 (for example, a touch display screen), a camera assembly 1406, an audio circuit 1407, a positioning component 1408, and a power supply 1409.

A person skilled in the art may understand that the structure shown in FIG. 14 does not constitute any limitation on the computer device 1400, and the computer device may include more components or fewer components than those shown in the figure, or some components may be combined, or a different component deployment may be used.

The memory stores at least one instruction, at least one program, a code set or an instruction set, the at least one instruction, the at least one program, the code set or the instruction set being loaded and executed by the processor to implement the method for displaying a virtual environment picture in the foregoing aspects.

The present disclosure provides a computer-readable storage medium, the computer-readable storage medium storing at least one instruction, at least one program, a code set or an instruction set, the at least one instruction, the at least one program, the code set or the instruction set being loaded and executed by a processor to implement the method for displaying a virtual environment picture described in the foregoing aspects.

The present disclosure further provides a computer program product, the computer program product, when run on a computer (for example, a terminal), causing the computer (for example, a terminal) to perform the method for displaying a virtual environment picture according to the foregoing method embodiments.

The sequence numbers of the foregoing embodiments of the present disclosure are merely for description purpose, and are not intended to indicate the preference among the embodiments.

A person of ordinary skill in the art may understand that all or some of the steps of the foregoing embodiments may be implemented by hardware, or may be implemented a program instructing related hardware. The program may be stored in a computer-readable storage medium. The storage medium may be: a ROM, a magnetic disk, or an optical disc.

The foregoing descriptions are merely exemplary embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for displaying a virtual environment picture, performed by a terminal, the method comprising:

displaying a virtual environment picture corresponding to a first virtual character and a wheel skill control, the wheel skill control being a control configured to cast a directional skill of the first virtual character and comprising: an inner region and an outer region surrounding the inner region;

receiving a skill cast operation on the wheel skill control;

determining that the skill cast operation is a first-type cast operation upon detecting that the skill cast operation is located in the inner region; and skipping displaying a skill indicator in the virtual environment picture in response to that the skill cast operation is the first-type cast operation and a selected second virtual character exists, the skill indicator being configured to indicate at least one of an aiming direction of the directional skill and a cast region.

2. The method according to claim 1, wherein the inner region and the outer region are circles.

3. The method according to claim 1, further comprising:

determining that the selected second virtual character exists upon detecting one candidate second virtual character in a range indicator.

4. The method according to claim 3, further comprising:

displaying the skill indicator in the virtual environment picture in response to that the operation position of the skill cast operation is located in the inner region and two or more selected second virtual characters exist.

5. The method according to claim 1, further comprising:

displaying the skill indicator in the virtual environment picture in response to that the operation position of the skill cast operation is located in the outer region.

6. The method according to claim 1, further comprising:

displaying the skill indicator in the virtual environment picture in response to that the first-type cast operation ends and before the directional skill of the first virtual character is cast, the skill indicator pointing to the second virtual character.

7. The method according to claim 6, wherein the displaying the skill indicator in the virtual environment picture comprises:

displaying the skill indicator in the virtual environment picture in a first manner, the first manner comprising at least one of the following: displaying in a first color, displaying in a first style, and displaying with a first special effect.

8. The method according to claim 1, further comprising:

displaying the skill indicator in the virtual environment picture in a second manner in response to that the skill cast operation is received on the wheel skill control and the directional skill corresponding to the wheel skill control is in an unavailable state, the second manner comprising at least one of: displaying in a second color, displaying in a second style, or displaying with a second special effect.

9. The method according to claim 1, wherein the skill indicator comprises an arrow skill indicator or a range skill indicator.

10. A computer device, comprising a processor and a memory, the memory storing at least one instruction, at least one program, a code set or an instruction set, the at least one instruction, the at least one program, the code set or the instruction set being loaded and executed by the processor to implement:

displaying a virtual environment picture corresponding to a first virtual character and a wheel skill control, the wheel skill control being a control configured to cast a directional skill of the first virtual character and comprising: an inner region and an outer region surrounding the inner region;

receiving a skill cast operation on the wheel skill control;

determining that the skill cast operation is a first-type cast operation upon detecting that the skill cast operation is located in the inner region; and skipping displaying a skill indicator in the virtual environment picture in response to that the skill cast operation is a first-type cast operation and a selected second virtual character exists, the skill indicator being configured to indicate at least one of an aiming direction of the directional skill and a cast region.

11. The device according to claim 10, wherein inner region and the outer region are circles.

12. The device according to claim 10, wherein the processor is further configured to perform:

determining that the selected second virtual character exists upon detecting one candidate second virtual character in a range indicator.

13. The device according to claim 12, wherein the processor is further configured to perform:

displaying the skill indicator in the virtual environment picture in response to that the operation position of the skill cast operation is located in the inner region and two or more selected second virtual characters exist.

14. The device according to claim 10, wherein the processor is further configured to perform:

displaying the skill indicator in the virtual environment picture in response to that the operation position of the skill cast operation is located in the outer region.

15. The device according to claim 10, wherein the processor is further configured to perform:

displaying the skill indicator in the UI in response to that the first-type cast operation ends and a skill of the first virtual character has not been cast, the skill indicator pointing to the second virtual character.

16. The device according to claim 15, wherein the displaying the skill indicator in the virtual environment picture comprises:

displaying the skill indicator in the virtual environment picture in a first manner, the first manner comprising at least one of the following: displaying in a first color, displaying in a first style, and displaying with a first special effect.

17. The device according to claim 10, wherein the processor is further configured to perform:

displaying the skill indicator in the virtual environment picture in a second manner in response to that the skill cast operation is received on the wheel skill control and the directional skill corresponding to the wheel skill control is in an unavailable state, the second manner comprising at least one of: displaying in a second color, displaying in a second style, or displaying with a second special effect.

18. The device according to claim 10, wherein the skill indicator comprises an arrow skill indicator or a range skill indicator.

19. A non-transitory computer-readable storage medium, storing at least one instruction, at least one program, a code set or an instruction set, the at least one instruction, the at least one program, the code set or the instruction set being loaded and executed by a processor to implement:

displaying a virtual environment picture corresponding to a first virtual character and a wheel skill control, the wheel skill control being a control configured to cast a directional skill of the first virtual character and comprising: an inner region and an outer region surrounding the inner region;

receiving a skill cast operation on the wheel skill control;

determining that the skill cast operation is a first-type cast operation upon detecting that the skill cast operation is located in the inner region; and skipping displaying a skill indicator in the virtual environment picture in response to that the skill cast operation is a first-type cast operation and a selected second virtual character exists, the skill indicator being configured to indicate at least one of an aiming direction of the directional skill and a cast region.

20. The method according to claim 1, wherein the inner region and the outer region shares a same center.

* * * * *